Figure 2A:
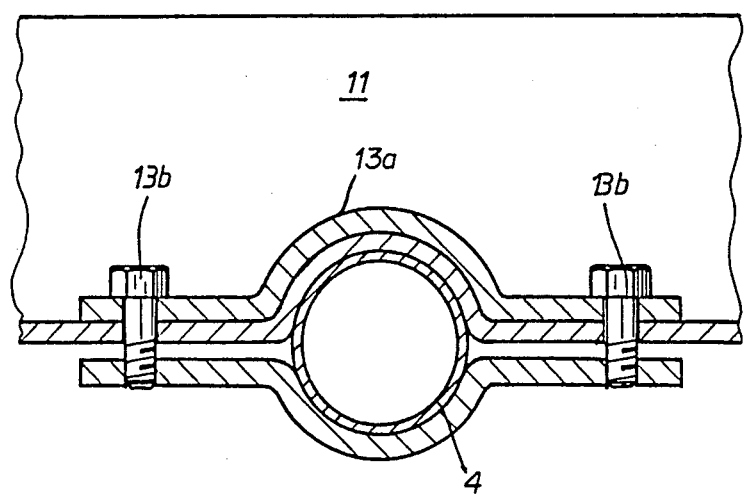

United States Patent [19]

Janz

[11] Patent Number: 4,730,873

[45] Date of Patent: Mar. 15, 1988

[54] SEAT SHELL FOR A MOTOR VEHICLE SEAT

[75] Inventor: Gerhard Janz, Rohrau, Fed. Rep. of Germany

[73] Assignee: Daimler-Benz Aktiengesellschaft, Stuttgart, Fed. Rep. of Germany

[21] Appl. No.: 870,387

[22] Filed: Jun. 4, 1986

[30] Foreign Application Priority Data

Jun. 4, 1985 [DE] Fed. Rep. of Germany ....... 3519941

[51] Int. Cl.$^4$ ............................ A47C 7/16; B60N 1/00
[52] U.S. Cl. .................................... 297/457; 297/232; 297/DIG. 2
[58] Field of Search ................. 297/457, DIG. 2, 452, 297/232

[56] References Cited

U.S. PATENT DOCUMENTS

| D. 182,063 | 2/1958 | Dean et al. | 297/DIG. 2 |
| 2,572,482 | 10/1951 | Hoven et al. | 297/DIG. 2 |
| 2,845,111 | 7/1958 | Barecki et al. | 297/DIG. 2 |
| 3,619,004 | 11/1971 | McKernan et al. | 297/DIG. 2 |
| 3,737,198 | 6/1973 | Barecki et al. | 297/457 X |
| 4,088,367 | 5/1978 | Atkinson et al. | 297/457 |

FOREIGN PATENT DOCUMENTS 3227342  2/1983  Fed. Rep. of Germany .

Primary Examiner—Kenneth J. Dorner
Assistant Examiner—Peter R. Brown
Attorney, Agent, or Firm—Barnes & Thornburg

[57] ABSTRACT

In a one-piece seat shell which consists of at least two individual seats and which, on every outer seating edge, has a closed channel which runs from the front side of the seat up to the upper side of the seat back and is set back from the rear side of the seat shell and which is provided on the channel base side with reinforcing portions for accommodating fastening means, a further channel, formed like the outer lying channel, is also located in the transition area between the two individual seats and is likewise closed on the front side.

15 Claims, 4 Drawing Figures

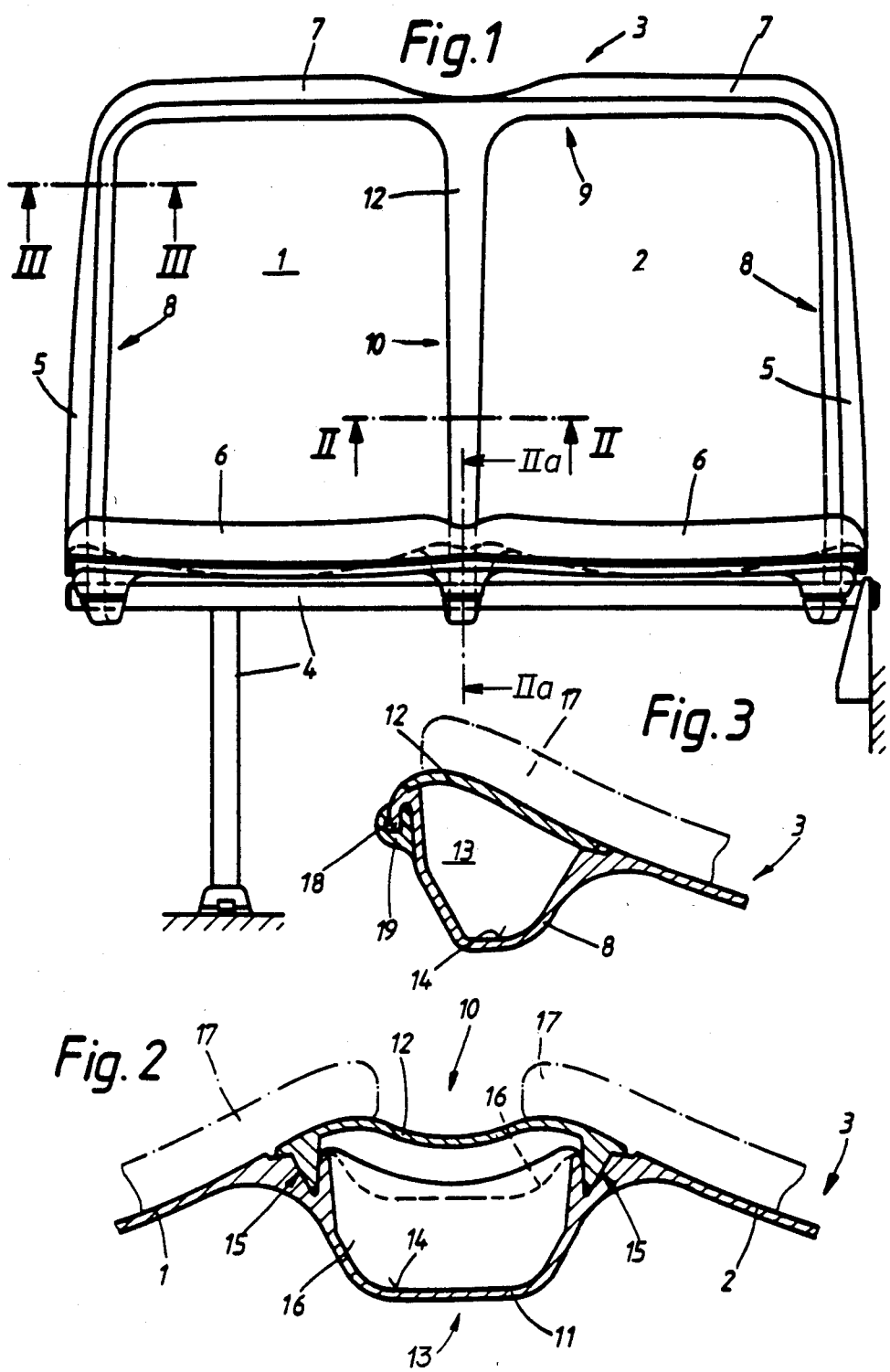

SEAT SHELL FOR A MOTOR VEHICLE SEAT

The invention relates to a seat shell for a seat in a motor vehicle, having a channel which is integrally formed at least on every lateral seating edge from the front side of the seat up to the upper side of the seat back and which, in the channel base area, is provided with reinforcing portions for accommodating fastening means, with the channel being set back from the rear side of the seat shell, from its seating or seat-back surface, and being closed at the front side of the seat shell, while being adapted to the surface course of the latter and enclosing a hollow space and the reinforcing portions.

Such a seat shell for an individual seat is known from the German Offenlegungsschrift No. 3,227,342, which seat shell, in a simple and cost-effective construction, has a high rigidity.

The object of the invention is to make it possible to also embody several connected seats while maintaining the advantageous properties known from individual seats.

It is an object of the invention to overcome the shortcomings of the prior art.

It is an object of the invention to provide a seat shell for a seat in a motor vehicle, having a channel which is integrally formed and runs at least on every outer seating edge from the front side of the seat up to the upper side of the seat back and which, in the channel base area, is provided with reinforcing portions for accommodating fastening means, with the channel being set back from the rear side of the seat shell, from its seating or seat-back surface, and being closed at the front side of the seat shell, while being adapted to the surface course of the latter and enclosing a hollow space and the reinforcing portions, characterized in that the seat shell is made in a way known per se from at least two individual seats connected in one piece to one another, and that the connecting area between two individual seats is formed by a single, set-back channel which is closed on the from side of the seat shell.

It is a further object of the invention to provide a seat shell wherein a channel is covered simply and in a manner which increases the strength if a closure is effected by a cover, for example held in place by adhesive, the rear side of which, on the longitudinal edge side, is supported against the seat shell via groove-and-tongue connections.

It is another object of the invention to provide a seat shell wherein an increase in strength effected by printing a cover and/or channel with stiffening ribs on the hollow space side in the connecting area.

It is another object of the invention to provide a seat shell wherein stiffening ribs can run transversely to the main extension direction of the channel.

It is another object of the invention to provide a seat shell with stiffening ribs which are integrally formed with the channel.

It is another object of the invention to provide a seat shell for a motor vehicle seat and having a front and back and with at least a plurality of seats, each seat having a corresponding seat back, each seat and seat back having a left side edge and a right side edge, each seat back having a top edge, and comprising a channel contiguous to said edges and top edges and open toward the said front means closing the channel to form a space.

These and other objects, features, and advantages of the present invention will become more apparent from the following description when taken in connection with the accompanying drawings which show, for purposes of illustration only, one embodiment in accordance with the present invention, and wherein:

FIG. 1 shows the front view of a seat shell consisting of two individual seats and having a one-piece cover closing the set-back channel, FIG. 2 shows a section along line II—II in FIG. 1, FIG. 2A is a sectional view of mounting a seat shell to a frame taken along line IIa—IIa in FIG. 1; and FIG. 3 shows a section along line III—III in FIG. 1.

Referring now to the drawings wherein like reference numerals are used to designate like parts and more particularly to FIG. 1, a one-piece seat shell 3 is shown consisting of two individual seats rests on a tubular frame 4 which is placed, in a manner not shown, in the inner space of a bus. At each outer seating edge 5, a channel 8 runs from the front side 6 of the sat shell 3 up to the upper side 7 of its seat back, with a channel portion 9 which extends across the upper side and connects the two channels 8 to one another. The connecting area 10 between the two individual seats 1 and 2 is formed by a branching channel 11 which branches from the channel portion 9 and is let up to the front side 6 of the seat shell 3 (FIG. 2).

As can be seen in particular from FIGS. 2 and 3, the channels 8 and branching channel 11 and also, in a manner not shown, the channel portion 9 are set back on the rear side of the seat shell 3 and are closed by a cover 12. In the hollow space 13 thus created are arranged reinforcing members 13a, FIG. 2A, in certain sections of the channel base area 14, which reinforcing members, with the aid of fastening means 13b, for example in the area of the tubular frame 4, are used for fixing the seat shell 3 in a position, but which can also be used in other sections for fixing attachments such as hand grips and head rests.

In FIG. 2, the cover 12 is made in one piece, but it could just as easily be divided into individual sections. As follows from FIG. 2, there is a tongue-and-groove connection 15 for increasing the strength between the cover 12 and channel 11, with an intimate connection being achieved, for example, with the aid of an adhesive. In order to increase the strength further, stiffening ribs 16, extending transversely to the main extension direction of the channel 11 and spaced relative to one another, project from both the cover 12 and the channel 11.

As indicated in FIGS. 2 and 3, the front side 6 of the seat shell 3, in the area of the individual seats 1 and 2, is provided with an upholstery overlay 17 shown in outline and at least partially covering the cover 12, and it also follows from FIG. 3 that the side edge 18 of the seat shell 3 is covered by a profiled strip 19 which prevents injuries.

While I have shown and described only one embodiment in accordance with the present invention, it is understood that the same is not limited thereto but is susceptible to numerous changes and modifications as known to one having ordinary skill in the art, and I, therefore, do not wish to be limited to the details shown and described herein, but intend to cover all such modifications as are encompassed by the scope of the appended claims.

I claim:

1. A single seat shell for a motor vehicle seat, having an integrally formed outer edge and a first channel portion having an integral channel bottom area and an open top area which runs along at least said outer edge from a front side of the seat up to an upper side of a seat back and which is provided with reinforcing members for accommodating fastening means for supporting the seat shell, with the channel being set back from a rear side of the seat shell, from a seating and seat back surface, and the channel being closed by closure means configured to the surface of the seat shell to define a hollow space wherein:

the single seat shell comprises at least two individual seats connected in one piece to one another, and that a connecting area between the seating area of two individual seats is formed by two adjacent portions of the seating area having downwardly extending portions defining side walls of a channel portion of the seat shell and having a bottom portion connecting said downwardly extending portions and an open top area, the channel portion being closed by a closure portion means.

and wherein said closed channel portions provide internal rigidity to the single seat shell.

2. A single seat shell according to claim 1, characterized in that closure of the hollow space along the outer edge is effected by a cover means held in place by adhesive, a side of the cover means along the outer edge being supported against the seat shell via tongue-and-groove connections.

3. A single seat shell according to claim 2, characterized in that one of the cover and the channel portion is provided with stiffening ribs adjacent the hollow space.

4. A single seat shell according to claim 3, characterized in that the stiffening ribs run transversely to a main extension direction of the channel portion.

5. A single seat shell according to claim 4, characterized in that the stiffening ribs are integrally formed with the channel portion.

6. A single seat shell according to claim 2, characterized in that stiffening ribs run transversely to a main extension direction of the channel portion.

7. A single seat shell according to claim 6, characterized in that the stiffening ribs are integrally formed with the channel portion.

8. A single seat shell according to claim 1, characterized in that one of the closure means and the channel portion is provided with stiffening ribs adjacent the hollow space.

9. A single seat shell according to claim 8, characterized in that the stiffening ribs run transversely to a main extension direction of the channel portion.

10. A single seat shell according to claim 9, characterized in that the stiffening ribs are integrally formed with the channel portion.

11. A single seat shell according to claim 1, characterized in that stiffening ribs run transversely to a main extension direction of the channel portion.

12. A single seat shell according to claim 11, characterized in that the stiffening ribs are integrally formed with the channel portion.

13. A single seat shell for a motor vehicle seat and having a front and back and with at least a plurality of seat portions, each seat having a corresponding seat back, each seat portion and seat back having a left side edge and a right side edge, each seat back having a top edge, and comprising a channel portion of said shell contiguous to all said side edges and said top edges and having an open area toward said seat portion and seat back, means closing the open area of said channel portion to form a space, and wherein said closed channel portion between the seat portions being defined by downwardly integral projecting parts of said seat portions which are interconnected by a bottom integral part of said seat portion and wherein all said closed channel portions provide internal rigidity to the single seat shell.

14. A single seat shell in accordance with claim 13, wherein said means comprises a cover, and said seat shell further comprises tongue means and groove means, each mounted to one of said channel portions and said means for closing the open area of said channel portion.

15. A single seat shell in accordance with claim 13, further comprising rib means mounted to one of the cover and the channel portion for stiffening the seat shell.

* * * * *